US010686704B2

(12) United States Patent
Roncero Izquirdo et al.

(10) Patent No.: US 10,686,704 B2
(45) Date of Patent: Jun. 16, 2020

(54) METHOD AND APPARATUS FOR PROVIDING A LOW LATENCY TRANSMISSION SYSTEM USING ADAPTIVE BUFFERING ESTIMATION

(71) Applicant: Cavium, LLC, Santa Clara, CA (US)

(72) Inventors: Francisco J. Roncero Izquirdo, Leganes (ES); Gorka Garcia Rodriguez, Madrid (ES)

(73) Assignee: Cavium, LLC., Santa Clara, CA (US)

(*) Notice: Subject to any disclaimer, the term of this patent is extended or adjusted under 35 U.S.C. 154(b) by 50 days.

(21) Appl. No.: 15/957,566

(22) Filed: Apr. 19, 2018

(65) Prior Publication Data

US 2018/0241675 A1    Aug. 23, 2018

Related U.S. Application Data

(62) Division of application No. 14/838,056, filed on Aug. 27, 2015, now Pat. No. 9,985,887.

(51) Int. Cl.
| | |
|---|---|
| *G01R 31/08* | (2020.01) |
| *H04L 12/801* | (2013.01) |
| *H04L 12/851* | (2013.01) |
| *H04L 12/835* | (2013.01) |
| *H04N 21/647* | (2011.01) |
| *H04N 21/44* | (2011.01) |
| *H04N 21/442* | (2011.01) |
| *H04N 21/24* | (2011.01) |
| *H04N 21/439* | (2011.01) |

(52) U.S. Cl.
CPC .............. *H04L 47/12* (2013.01); *H04L 47/24* (2013.01); *H04L 47/30* (2013.01); *H04N 21/2401* (2013.01); *H04N 21/4392* (2013.01); *H04N 21/44004* (2013.01); *H04N 21/4424* (2013.01); *H04N 21/64738* (2013.01)

(58) Field of Classification Search
CPC ...................................................... H04L 47/12
See application file for complete search history.

(56) References Cited

U.S. PATENT DOCUMENTS

| | | | | |
|---|---|---|---|---|
| 5,963,551 A | * | 10/1999 | Minko | ................ H04L 12/6418 370/356 |
| 6,031,818 A | * | 2/2000 | Lo | ......................... H04L 1/1809 370/216 |

(Continued)

*Primary Examiner* — Gerald A Smarth
(74) *Attorney, Agent, or Firm* — JW Law Group; James M. Wu

(57) ABSTRACT

One aspect of the present invention discloses a network system capable of transmitting and processing audio video ("A/V") data with enhanced quality of service ("QoS"). The network system includes a transmitter, a transmission channel, an adjustable decoder buffer, and a decoder. The transmitter contains an encoder able to encode A/V data in accordance with encoding bit rate recommendation from SQoS and packets loss notifications. The transmission channel, in one example, transmits A/V data from the transmitter or the receiver. The adjustable decoder buffer, in one aspect, is able to change its storage capacity or buffering size in response to the adaptive latency estimate. Upon fetching at least a portion of the A/V data from the adjustable decoder buffer, SQoS updates the adaptive latency estimate based on the quality of the decoded A/V data.

18 Claims, 9 Drawing Sheets

(56) References Cited

U.S. PATENT DOCUMENTS

| | | | | |
|---|---|---|---|---|
| 6,665,317 | B1* | 12/2003 | Scott | H04L 12/6418 370/253 |
| 7,187,697 | B1* | 3/2007 | Aviely | H04L 47/10 370/517 |
| 2002/0146023 | A1* | 10/2002 | Myers | H04L 47/10 370/412 |
| 2003/0202528 | A1* | 10/2003 | Eckberg | H04L 12/6418 370/412 |
| 2004/0008625 | A1* | 1/2004 | Lee | H04L 12/5601 370/229 |
| 2006/0062216 | A1* | 3/2006 | Li | H04L 49/205 370/389 |
| 2014/0226476 | A1* | 8/2014 | Bertze | H04L 47/30 370/230.1 |
| 2015/0078372 | A1* | 3/2015 | Mani | H04L 1/0041 370/352 |
| 2015/0319212 | A1* | 11/2015 | Mani | H04L 47/34 370/352 |

* cited by examiner

METHOD AND APPARATUS FOR PROVIDING A LOW LATENCY TRANSMISSION SYSTEM USING ADAPTIVE BUFFERING ESTIMATION

PRIORITY

This application is a divisional application of U.S. patent application Ser. No. 14/838,056, filed on Aug. 27, 2015 in the name of the same inventor and entitled "Method and Apparatus for Providing a Low Latency Transmission System Using Adaptive Buffering Estimation," which has been issued into the U.S. Pat. No. 9,985,887, the disclosure of which is hereby incorporated into the present application by reference.

RELATED APPLICATION

This application is related to the following co-pending application assigned to the Assignee of the present invention.

a. application Ser. No. 14/838,088, filed on Aug. 27, 2015, entitled "Method and Apparatus for Providing a Low Latency Transmission System Using Adjustable Buffers," invented by Izquierdo and Rodriguez.

FIELD

The exemplary embodiment(s) of the present invention relates to telecommunications network. More specifically, the exemplary embodiment(s) of the present invention relates to quality of service ("QoS") in connection to multimedia data transmission.

BACKGROUND

A typical high-speed communication network, which is able to deliver massive amount of information and/or data between sources and destinations, may contain multiple networks. The information may travel across one or more networks to reach its destination. For example, the networks may include, but not limited to, wired network, backbone network, wireless network, cellular network, wireless personal area network ("WPAN"), wireless local area network ("WLAN"), wireless metropolitan area network ("MAN"), or a combination of wired, backbone, wireless, cellular, WPAN, WLAN, MAN, WIFI, or the like.

With rapidly growing trend of mobile and remote data access over the high-speed communication network such as 3G or 4G cellular services, accurately delivering and deciphering data streams become increasingly challenging and difficult. With popularity of wireless multimedia information delivery to portable devices, the demand for faster and quality audio/video ("A/V") data streaming is high. However, a problem associated with A/V transmission via a conventional system is A/V quality degradation, such as A/V distortion, video judder, and/or audio jitter, partially due to network jitter.

SUMMARY

The following summary illustrates a simplified version(s) of one or more aspects of present invention. The purpose of this summary is to present some concepts in a simplified description as more detailed description that will be presented later.

One aspect of the present invention discloses a network system able to improve QoS in transmitting A/V data using smart QoS ("SQoS"). The network system, for example, includes a transmitter, transmission channel, adjustable decoder buffer, and decoder and employs SQoS to achieve optimal quality during A/V data transmission process. The transmitter contains an encoder and is able to encode A/V data packets in accordance with a process of SQoS which, in one aspect, includes adaptive latency estimation for facilitating optimal A/V quality. For encoding configuration carried out by an encoder, not only the adaptive latency estimation will be used, but also other parameters such as packets loss and A/V bit rate are used to help achieving optimal A/V quality. While the transmission channel transmits A/V data between the transmitter and the sink, the adjustable decoder buffer is adjustable in response to the adaptive latency estimate. The decoder fetches the A/V data packets from the adjustable decoder buffer for decoding. In one aspect, the decoder is capable of generating or updating the adaptive latency estimate based on the quality of decoded A/V data and network jitter estimation.

Additional features and benefits of the exemplary embodiment(s) of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
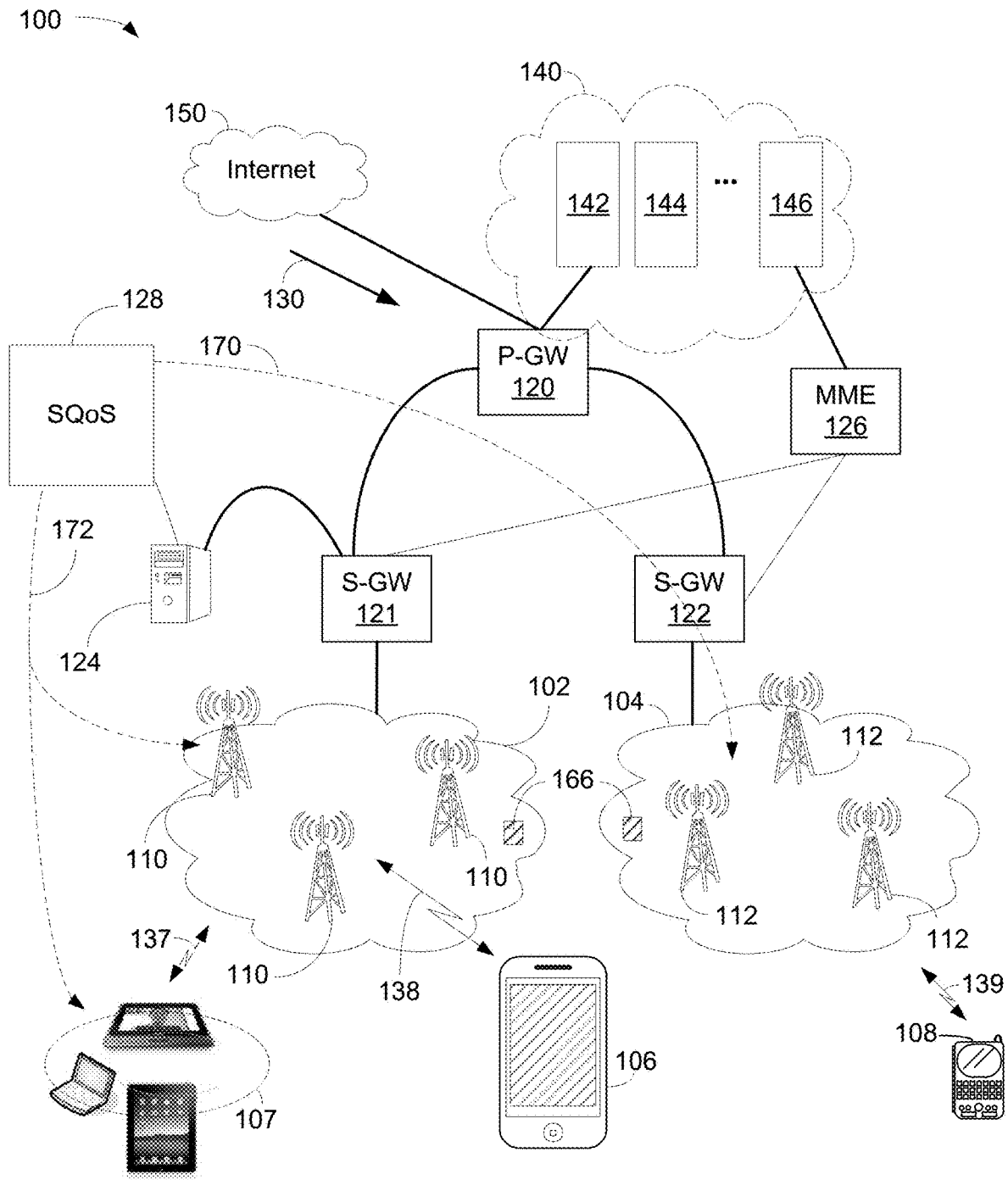
FIG. 1 is a block diagram illustrating a computing network configured to transmit data streams using smart quality of service ("SQoS") in accordance with one embodiment of the present invention.

Aspects of the present invention are described herein in the context of methods and/or apparatus for transmitting packet streams or packet flows using smart quality of service ("SQoS") to achieve optimal audio/video ("A/V") quality.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One aspect of the present invention discloses a network system employing SQoS able to enhance QoS associated with A/V data packets transmission. The network system includes a transmitter, transmission channel, adjustable decoder buffer, and decoder. The transmitter contains an encoder and is able to encode A/V data or A/V data packets in accordance with an adaptive latency estimate. The transmission channel, in one example, transmits or transports A/V data packets from one end such as transmitter to another end such as receiver. Note that transmitter can also be referred to as source or originator while receiver can also be referred to as destination and sink.

SQoS, in one embodiment, uses variable buffers also known as adjustable decoder buffer, and adaptive latency estimation to improve A/V image quality. For instance, after providing a preliminary estimation during an initial phase, SQoS provides fine tuning to achieve optimal latency estimation using variable buffers. The adaptive latency estimation, in one example, is continuously updated based on the A/V artifacts from decoded A/V frames. In one aspect, the buffer status statistics analysis is used to identify A/V artifacts in connection to the A/V frames and the latency estimation. With the analysis of A/V playback performance associated with decoded A/V frames, SQoS updates the buffer status statistics analysis which is subsequently used to refine the size of the buffer.

The adjustable decoder buffer, in one aspect, is capable of dynamically adjusting or altering its storage capacity or buffering size in response to the adaptive latency estimate. In one example, upon fetching at least a portion of the A/V data packets from the adjustable decoder buffer, the decoder generates A/V frames or A/V presentation according to decoded A/V data. After generating the A/V frames, the adaptive latency estimate(s) is updated based on the analysis of decoder buffer occupation over the time and the quality of the decoded A/V data packets or quality of A/V frames. It should be noted that to achieve optimal A/V quality, SQoS estimates or identifies network jitter and subsequently estimates capacity of buffer based on statistic values.

FIG. 1 is a block diagram 100 illustrating a computing network configured to transmit data streams using smart quality of service ("SQoS") in accordance with one embodiment of the present invention. Diagram 100 includes packet data network gateway ("P-GW") 120, two serving gateways ("S-GWs") 121-122, two base stations (or cell sites) 102-104, user equipment ("UE") 106-108, server 124, and Internet 150. P-GW 120 includes various components 140 such as billing module 142, subscribing module 144, and/or tracking module 146 to facilitate routing activities between sources and destinations. In one aspect, SQoS 128 is implemented in the network to provide an improved A/V quality using encoding parameters, channel characteristics, and/or decoding characteristics. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), 4G, LTE, or combination of 3G and 4G cellular network configuration. MME 126, for example, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102-104, is capable of routing data packets from base station 102, or eNodeB, to P-GW 120 and/or MME 126. A function of S-GW 121 or 122 is to perform an anchoring function for mobility between 3G and 4G equipments. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between UE 106-108 and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core network(s).

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land-based switching circuitry.

Server 124 is coupled to P-GW 120 and base stations 102-104 via S-GW 121 or 122. In one aspect, server 124 includes SQoS or SQoS module 128 used to optimize A/V quality via latency and/or bandwidth adjustments. For example, the SQoS mechanism can deal with the task of trying to achieve optimal A/V quality performance through adjusting long and short-term variations associated with the transmitter, transmission channels, and sink (or receiver).

SQoS 128, in one aspect, can be implemented by software, firmware, hardware, and/or a combination of software, firmware, and hardware. SQoS 128 can reside in server 124, S-GW 121, base station 102, and/or EUs such as tablets 107. To improve quality of A/V data, SQoS 128, in one aspect, exams characteristics of source, characteristics of transmission channel, and characteristics of sink. The characteristics of source, in one example, include A/V coding efficiency, data packetization, and/or transmission performance. The data packetization, for example, involves organizing audio and video packets in an interleaving configuration. The transmission channel characteristics, in one example, involve long and short-term sessions based on current traffic conditions. The sink characteristics involve A/V decoding optimization including buffering.

An advantage of employing SQoS is to enhance overall quality (i.e., resolution, lip synchronization, clarity, and the like) of A/V presentation or playback.

Figure 2:
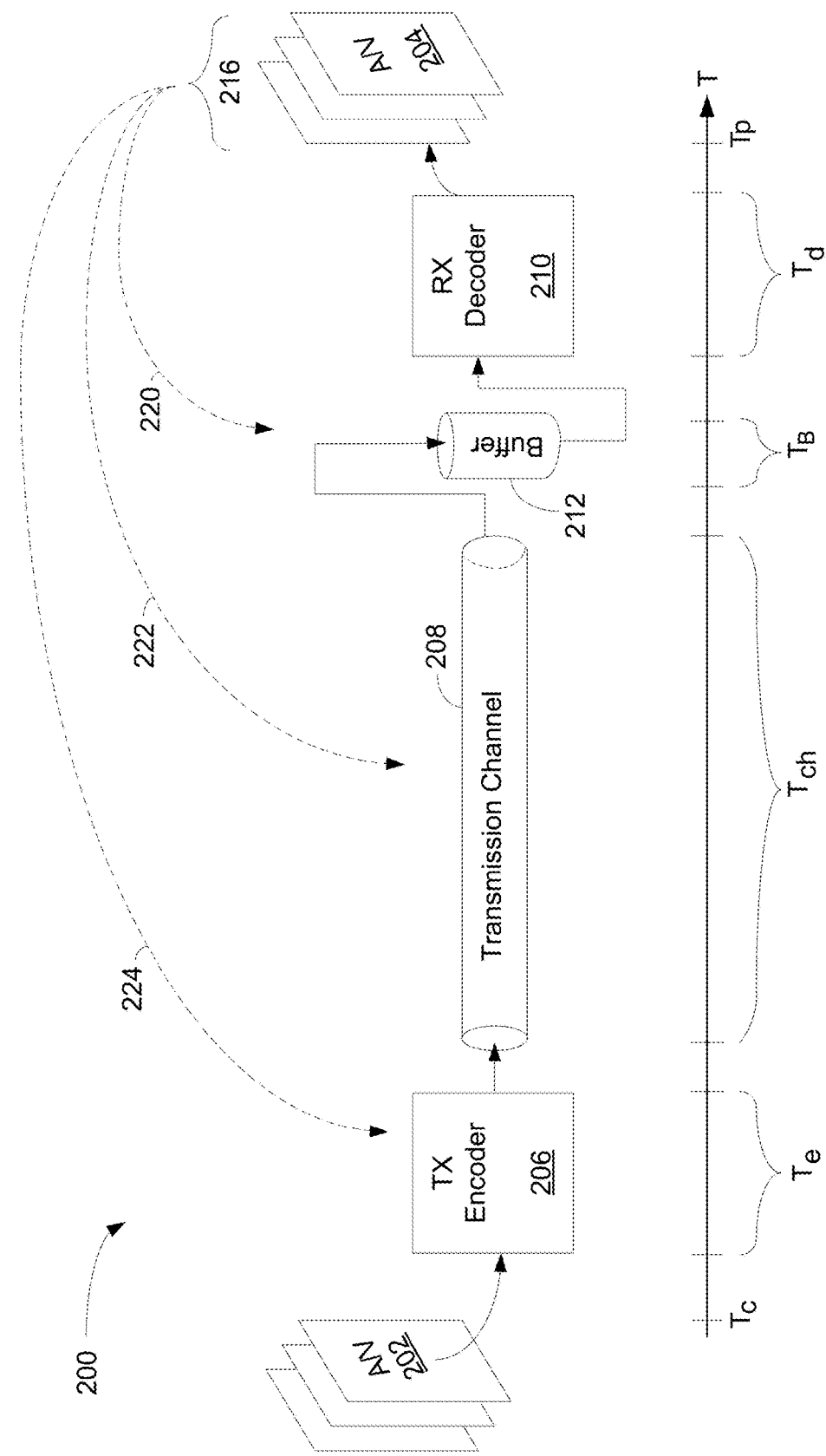
FIG. 2 is a block diagram illustrating a network mechanism of A/V data transmission using SQoS to enhance A/V quality in accordance with one embodiment of the present invention.

FIG. 2 is a block diagram 200 illustrating a network mechanism of A/V data transmission using SQoS to achieve optimal A/V quality in accordance with one embodiment of the present invention. Diagram 200 shows a network system capable of transmitting A/V data such as A/V packets or A/V flows between a source and a sink. The network system includes a transmitter ("TX") 206, a transmission channel 208, an adjustable decoder buffer 212, and a receiver ("RX") 210. TX 206 having an encoder encodes A/V input frames or packets 202 and RX 210 having a decoder decodes received A/V data and generates decoded A/V frames 204. It should be noted that the underlying concept of the exemplary embodiment(s) of the present invention would not change if one or more blocks (or devices) were added to or removed from diagram 200.

TX 206, in one aspect, includes an encoder which is configured to encode A/V data for transmission in accordance with SQoS operation. SQoS operation, in one aspect, includes adaptive latency estimation for facilitating optimal A/V quality. For encoding configuration carried out by an encoder, not only the adaptive latency estimation will be used, but also other parameters such as packets loss and A/V bit rate are used to help achieving optimal A/V quality. The adaptive latency estimate(s), which is received by TX 206, is generated or updated based on earlier analysis of buffer status as well as decoded A/V playback frames 216 as indicated by arrows 220-224. Transmission channel 208, which can be a wireless session between radio towers, is configured to transmit A/V data packets from TX 206 to RX 210. In one example, transmission channel 208 can be WIFI channel, satellite network, blue tooth network, and/or a combination of WIFI, satellite, blue tooth, and/or land-based network channels.

Adjustable decoder buffer 212 capable of adjusting its storage capacity based on the adaptive latency estimate is operable to temporary buffer or store received A/V data or packets via transmission channel 208. A benefit of buffering input packet flow(s) is to avoid impact on A/V quality due to buffer underflow condition. The underflow condition, in one example, indicates empty buffer and there is no data or packets to decode. Another benefit of buffering input packet flow(s) is, if needed, to synchronize the order of audio and video packets before decoding. To optimize A/V quality, the capacity of buffer 212 is an important factor because an optimal buffer capacity will define the probability to meet buffer underrun/overflow conditions that in the end will cause A/V degradation. In one example, a properly adjusted buffer size for buffer 212 can avoid A/V distortion as well as reduce packet loss. It should be noted that the capacity of buffer also affects E2E latency. A function of SQoS is to adjust buffer size in real-time based on buffer status analysis and feedback of the earlier decoded A/V presentation whereby a repetitive adjustment of buffer size over a period of time can achieve an optimal buffer size under certain circumstances such as current traffic condition and information (or data) characteristics in a minimum E2E latency scenario. Note that SQoS tries to identify an optimal instant to update buffer size when the updating is needed. The optimal instant to update buffer size will, for example, reduce and/or avoid impact on A/V quality. For example, reducing or avoiding audio packets drop can avoiding audio silence.

To decode A/V packet(s), decoder, which can be part of RX 210, retrieves at least a portion of A/V data packets from adjustable buffer or decoder buffer 212 for decoding. Based on adjustable buffer status long and short-term statistics and the A/V playback quality during or after decoding, SQoS, in one aspect, updates the adaptive latency estimate(s). For example, after analyzing buffer status statistics and upon detecting artifacts such as video judder and/or audio jitter, SQoS is capable of generating revised adaptive latency estimate based on the detected video judder and audio jitter. Alternatively, encoder within RX or sink 210 is able to change encoding configuration, such as transmission bandwidth, bit rate, video intra refresh, and the like at TX 206 based on updated adaptive latency estimate.

SQoS, in one aspect, is able to optimize overall A/V playback quality based on adjusting end-to-end ("E2E") latency. The E2E latency may be defined as the time between A/V capture ($T_C$) and A/V presentation ($T_P$) as illustrated in FIG. 2. The E2E latency (Tp–Tc) includes time for encoding Te, time for transmission $T_{ch}$, time for buffer $T_B$, and time for decoding Td. In a low latency scenario, the E2E latency is within hundreds milliseconds ("ms") but SQoS tools can also work on higher latency scenarios. Depending on the applications, 500 ms or less of E2E latency is considered as low latency. Note that when the source and the network are relatively stable, adjusting buffering size which affects E2E latency can reduce A/V artifacts and improve A/V quality.

For example, to reduce artifacts during A/V data transmission, the SQoS or SQoS algorithm continuously adjusts decoding latency and/or encoding parameter during real-time transmission until A/V quality is reached. To keep artifacts low, the E2E latency, in one example, is dynamically adjusted in real-time during the transmission. It should be noted that the buffering size or storage capacity of buffer 212 is tightly related to adaptive latency estimate. Note that the terms "latency estimation," "buffering size," and "buffer storage capability" are logically equivalent and they can be used interchangeably. The adaptive latency estimate, in one example, is generated by an adaptive latency estimation or process. The adaptive latency estimation ("ALE") is a repetitive process during the transmission and generates a set of estimate(s) using A/V quality from earlier decoded A/V data. The A/V quality includes, but not limited to, video judder, audio jitter, audio video lip synchronization, packets drop, and the like.

To control E2E latency, a buffer 212 is employed before decoding so that any unexpected fluctuations that could cause artifacts can be absorbed or reduced by the buffering process. In one aspect, the decoder starts the decoding process once the storage level in buffer 212 reaches a predefined level. Note that different buffering level contributes different E2E latencies for the streaming process. Upon notifying from the decoder, the encoder may adjust encoder's behavior based on the adaptive latency estimate. Otherwise, SQoS will adjust buffering capacity to achieve optimal A/V playback quality. The encoder's behavior, for example, includes setting higher priority or altering transmission bandwidth for A/V packet transmission. Otherwise SQoS will adjust buffering capacity to achieve optimal A/V playback quality.

To achieve higher A/V quality at the presentation time (Tp), SQoS, in one aspect, monitors and manages source device(s) as well as sink device(s) to deliver high A/V quality based on adaptive latency estimate. During initial phase, A/V encoding characteristics or parameters are set to default values. The exemplary A/V encoding characteristics or parameters could be bit rate, bandwidth, video INTRA refresh, video GOP configuration and/or data type. During transmission, the source such as TX 206 can be adjusted in real-time based on the adaptive latency estimate. Since the adaptive latency estimate is continuously updated based on the decoded A/V frames, the E2E latency is also constantly updated whereby the overall A/V quality is improved. In one aspect, a method of adjusting the E2E latency is to adjust the size of buffer 212.

When a set of A/V streams travel from source device(s) to sink device(s), certain degrees of A/V distortion and/or A/V artifacts can be caused by environment noise, encoding error, and/or traffic congestions. The A/V distortion or A/V artifacts include decoding errors, A/V display sync and/or smoothness miss-performance issues. For example, the resulted A/V distortion during the display time could occur due to a suboptimal transmission process.

A decoding error may be issued when an occurrence of packet loss is detected during transmission. It should be noted that packet(s) loss can happen at TX 206, transmission channel 208, and/or RX 210. In one example, an error may be issued when a mismatch of TX/RX performance occurs. Note that TX/RX mismatch, for example, indicates A/V display sync, A/V artifacts, and/or smoothness miss-performance. The mismatch may occur due to A/V artifacts, video judder/tearing, audio jitter/crapping, and/or A/V lip sync. SQoS, in one aspect, is capable of monitoring and identifying A/V packet flows based on a set of predefined A/V transmission parameters. Based on the result detected, SQoS is able to adjust system configuration to achieve an optimal transmission process. An optimal transmission process should provide high A/V quality with minimal distortion. It should be noted that SQoS components can be implemented at any stages along the A/V transmission blocks. For instance, SQoS can be implemented at TX 206, RX 210, and/or channel 208.

An advantage of using SQoS is that it improves A/V quality using optimized transmission process. SQoS, in one aspect, manages and adjusts various system characteristics to refine transmission process. The system characteristics include, but not limited to, A/V interleaving formation, network jitter analysis, and/or transmission bandwidth. While A/V encoding parameters deals with bit rate and frame/sample rate, the transmission channel characteristics are directed to sessions and/or WIFI channels. The A/V decoding characteristics are associated with A/V data buffering.

Figure 3A:
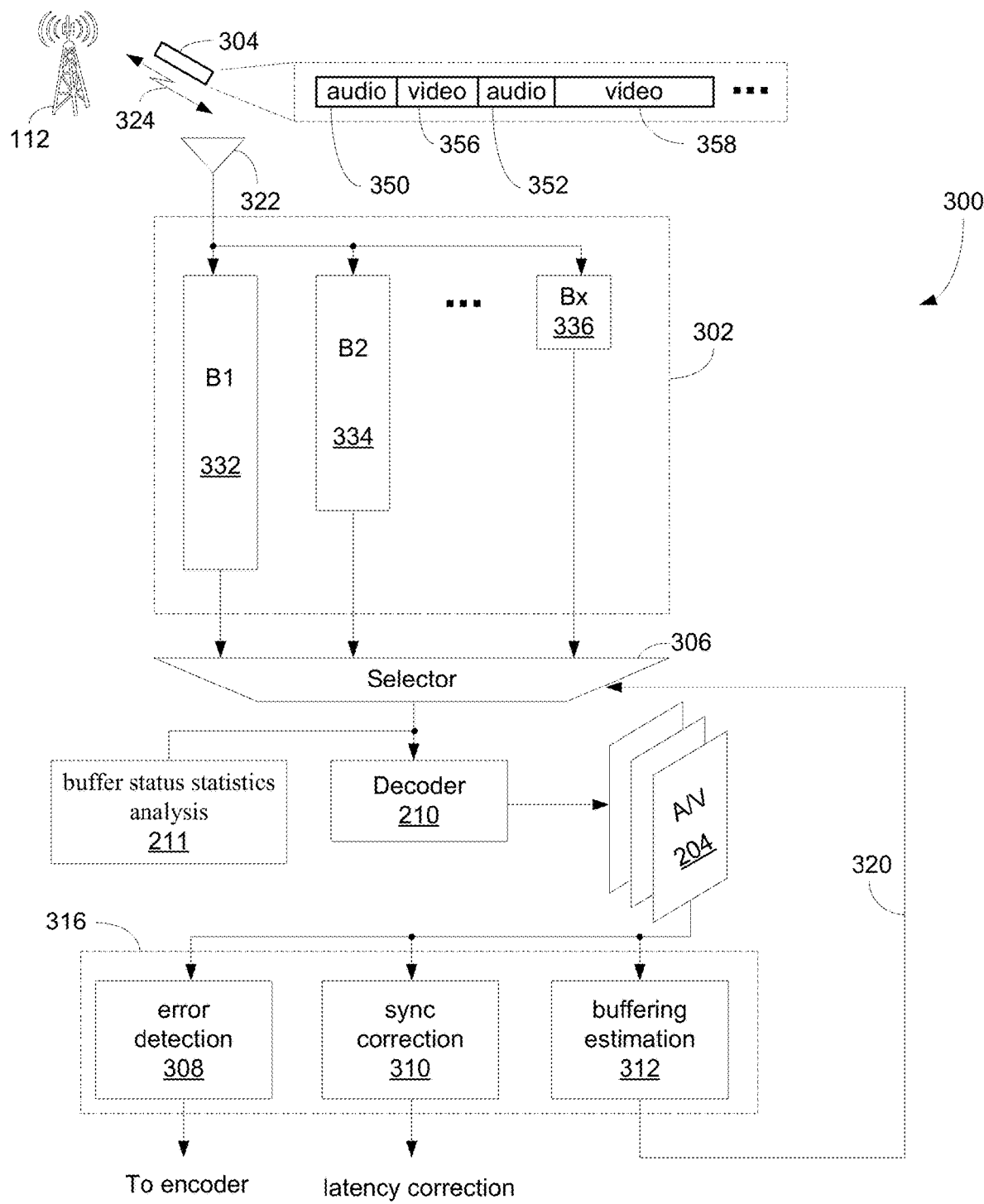
FIG. 3A is a block diagram illustrating logic flows of SQoS using a receiver to generate adaptive latency estimate(s) in accordance with one embodiment of the present invention.

FIG. 3A is a block diagram 300 illustrating logic flows of SQoS using a decoder to generate adaptive latency estimate(s) in accordance with one embodiment of the present invention. Diagram 300 illustrates a receiving (or sinking) device including a buffer or adaptive buffer 302, selector 306, decoder 210, buffer status statistics analysis 211, ALE module 316, and base station 112. SQoS, in one example, can be operated in buffer 302, selector 306, ALE module 316, or a combination of buffer 302, selector 306, and ALE module 316. Buffer status statistics analysis 211 provides analysis buffer capacity usage and records buffer status based on the adaptive latency estimate. It should be noted that the underlying concept of the exemplary embodiment(s) of the present invention would not change if one or more blocks (or devices) were added to or removed from diagram 300.

TX transmits A/V packet flow 304 to RX through a wireless communications channel 324 via base station 112. A/V packet flow 304 includes numerous audio packets 350-352 and video packets 356-358 wherein the audio packets and video packets are organized in an interleaving format. The interleaving format, in one aspect, indicates audio packets and video packets are organized or placed in an alternate position. For example, video packet 356 is situated between two audio packets 350-352. Similarly, audio packet 352 is situated between two video packets 356-368.

RX, in one aspect, includes antenna 322, buffer 302, decoder 210, and ALE module 316. Antenna 322 is able to receive wireless transmission such as A/V packet flow 304 from air. Upon arrival of wireless data such as A/V packet flow 304 at antenna 322, A/V packet flow 304 is, in one example, temporary stored or buffered in buffer 302. It should be noted that other receiving mechanism, such as additional antennas, channels, land-based cable connections or a combination of antenna(s), cable(s), and wire(s) may be used to offload information from tower 112.

Buffer 302, also known as latency buffer or adaptive buffer, is a temporary storage or buffer with adjustable storage capacity. To provide a buffer with adjustable storage capacity, buffer 302, in one aspect, employs multiple memory buffers 332-336 with different memory capacities. With the capability of adjustable buffer size, SQoS, in one example, is able to resize or adjust storage capacity of buffer 302 based on buffer status statistics analysis and decoded image/audio quality ("IAQ") A/V frames 204. IAQ, for instance, indicates image resolution, audio clarity, audio video synchronization, imaging phase transition, and the like. In one aspect, adaptive latency estimate is generated in response to IAQ.

Buffer 302, in one example, is a first-in first-out ("FIFO") memory component. Depending on the network traffic, data type, and network bandwidth, an optimal buffering capacity associated to buffer 302 can be obtained. In one aspect, SQoS is able to adjust buffering capacity of buffer 302 repeatedly and/or dynamically in a real-time based on the adaptive latency estimate. Different buffer size determines different latency time. During the packet transmission, SQoS continuously collects buffer status statistics, so after analyzing those statistics, adjust the buffer capacity in accordance with a preliminary adaptive latency estimate until an optimal or almost optimal buffering capacity is obtained. It should be noted that the optimal buffering capacity for buffer 302 may be reached after a period of adjustments.

For decoding, decoder 210 fetches A/V data or packets from buffer 302 via selector 306. After deciphering the A/V data, a set of A/V frames 204 are generated based on the fetched A/V data. At least a copy of A/V frames 204 is forward to ALE module 316 for producing new or updated adaptive latency estimate based on preliminary adaptive latency estimate. ALE module 316, in one example, includes an encoding estimation 308, sync correction 310, and preliminary latency estimation 312.

During an operation, a method of decoding A/V data or SQoS fetches a first stream of A/V packet from buffer 302 with an initial buffer size such as B2 334. After analyzing initial short-term buffer status statistics and the first stream of A/V packets decoded, such as frames 204 and identifying IAQ associated with the first stream of A/V packets, an adaptive A/V buffering estimate is generated. To generate IAQ, video judders, audio jitters, and A/V sync relating to first stream of A/V packets are identified or detected. Based on IAQ analysis, the buffer capacity of the buffer 302 capacity, initially estimated by buffer status statistics analysis, is updated. For example, moving from B2 334 to B1 332 of buffer 302 in accordance with the adaptive A/V buffering estimate is activated thereby subsequent data streams are stored in B1 of buffer 302. To improve overall efficiency of A/V data transmission, SQoS can also notify TX for changing encoding bit-rate according to the adaptive A/V buffering estimate.

SQoS uses buffer status statistics analysis as well as A/V quality or IAQ associated with a set of decoded A/V frames over a period of time to generate and update adaptive latency estimate. Note that A/V quality or IAQ analysis is part of ALE process. To improve overall efficiency of A/V packet flow transmission, SQoS monitors decoding errors from decoder information report, A/V display sync miss-performance, and A/V display smoothness miss-performance.

ALE module 316, in one aspect, includes an error detection 308, sync correction 310, and buffering estimation 312 and is able to provide at least a portion of adaptive latency estimation process. Error detection 308, in one example, includes a function of detecting and processing A/V decoding errors (or encoding errors). Sync correction 310, on the other hand, provides A/V display sync miss-performance. Buffering estimation 312, in one example, is used to optimize A/V display smoothness performance.

Error detection 308, in one example, uses decoded A/V frames 204 to monitor and detect A/V decoding errors. The decoding errors could be introduced at A/V elementary stream (ES) during encoding time. For instance, A/V decoding errors can occur due to packet loss during the transmission. The packet loss may be punctual packet loss or continuous packets loss. The punctual packet loss is a phenomenon of discrete packet missing. If the packet loss is continuous, it could indicate improper encoding bit rate. The improper encoding bit rate generally occurs at TX that selects an improper bandwidth during encoding. While the punctual packet loss can be difficult to predict, the continuous packet loss can be reduced by various adjustments such as changing encoding bit rate or adjusting buffer size.

A/V display sync miss-performance between audio and video is a process to correct punctual and/or A/V sync miss-performance at the receiving end such as RX. For example, if A/V sync miss-performance is off continuously at the receiving end, SQoS may adjust buffer capacity to lower the latency to correct the A/V sync miss-performance. Optimal A/V display smoothness performance indicates smooth A/V playback with no video judder, jumps, skips, no audio skipped, or crapped.

SQoS analyzes A/V smoothness performance to achieve optimal performance based on A/V playback or A/V frames 204. A/V playback, in one example, requires buffering the incoming A/V data flow prior to start decoding encoded content. The optimal smoothness can be achieved if the buffer or decoder buffer is neither underflow nor overflow. It is noted that buffering introduces latency. If the latency is not critical, a sufficiently large enough buffering can improve the performance to achieve better A/V playback.

In operation, if the original A/V content is smooth, buffering at the receiving end can be the major factor to achieve a better display smooth performance. The benefit of buffering at the RX side is that video and/or audio packets can wait until all packets are arrived before decoding. Buffering time which is determined based on the size of buffer approximately equals to the time required by A/V transmission blocks (TX and channel) to perform and process (encoding) as well as transmitting.

Audio video packets 350-358 are organized in an interleaving configuration. For example, each video packet is located between audio packets and each audio packet may be located between video packets. For a real-time A/V transmission system (i.e., A/V streaming), buffering is not only present in A/V content interleaving between audio and video packets, but also involving in A/V transmission, such as encoding, packetizing, and transmitting processes.

It should be noted that buffering can occur at various different stages and/or phases (i.e., places). For example, prior to encoding, A/V encoding buffering may be used to store A/V content to enhance performance. Also, A/V packetizing buffering could also be implemented before packetizing process. The Packetizing process involves in interleaving A/V packets. A process of A/V transmission buffering can also be performed before packet transmitting for smooth transmission.

Figure 3B:
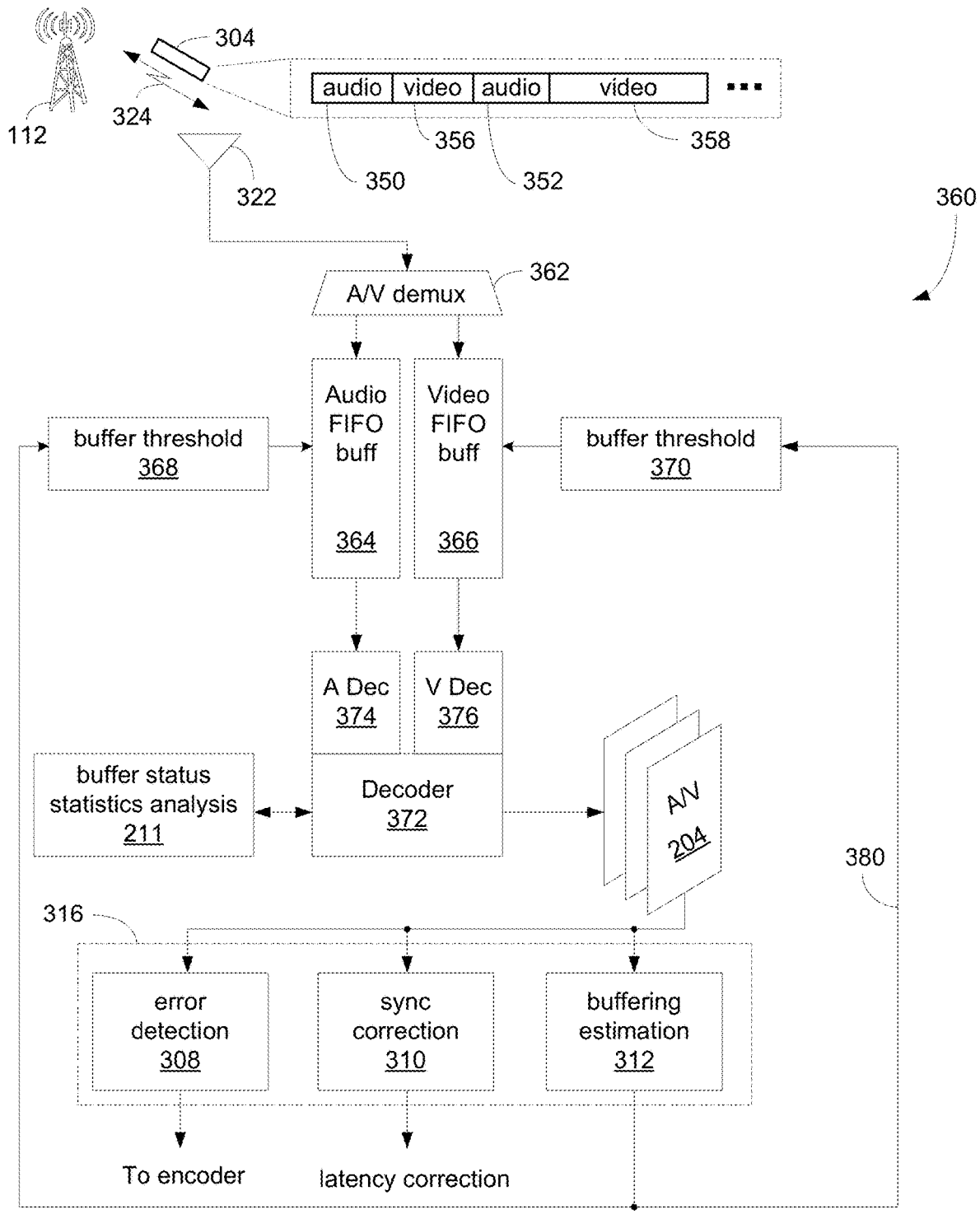
FIG. 3B is a block diagram illustrating logic flows of SQoS using variable buffers to generate adaptive latency estimate(s) in accordance with one embodiment of the present invention.

FIG. 3B is a block diagram 360 illustrating logic flows of SQoS or RX using an alternative buffer configuration to generate adaptive latency estimate(s) in accordance with one embodiment of the present invention. Diagram 360, which is similar to diagram 300 except the design of buffers 364-366 and decoder 372, illustrates a receiving (or sinking) device or RX, wireless communications channel 324, and base station 112. SQoS, in one example, can be operated in RX, TX, base station 112, and/or a combination of RX, TX, and network transmission devices. It should be noted that the underlying concept of the exemplary embodiment(s) of the present invention would not change if one or more blocks (or devices) were added to or removed from diagram 360.

RX, which hosts at least a portion of SQoS, includes a demultiplex ("demux") 362, audio FIFO buffer 264, video FIFO buffer 266, audio decoder 374, video decoder 376, decoder 372, and buffer status statistics analysis 211. In an alternative aspect, decoders 372-376 are configured into a single decoder with audio portion and video portion. Buffer status statistics analysis 211, which can be a module, is used to provide buffer usage statistics relating to buffer fullness at one instant of time. The usage and/or fullness of buffer can vary overtime based on various conditions such as network jitter. The condition or performance of the network can cause A/V artifacts during playback if the latency is not adequately adjusted to compensate the variation of the network performance.

Upon arrival of A/V packet stream 304, demux 362, in one aspect, is able to separate audio packets from video packets carried by A/V packet stream 304. A/V packet stream 304, in one example, is sent from a transmitter, not shown in FIG. 3B, via a communications network. After separating the video packets from audio packets, they are forwarded to one or more variable buffers for temporary storage.

Audio FIFO buffer 364 and video FIFO buffer 366 are two first-in first-out storage devices. In one example, buffers 364-366 are configured to have variable storage capacities. To control the storage capacity, buffer threshold or buffer threshold points 368-370 are used to determine the storage capacity or storage size of buffers 364-366. Buffer threshold pointers 368-370 can be one single pointer or multiple pointers based on the applications. For example, multiple threshold pointers can be used to facilitate different storage capacities between audio buffer 364 and video buffer 366. In one aspect, variable audio buffer 364 is used to buffer audio packets and variable video buffer 366 is used to buffer the video packets. The stored A/V packet stream can be retrieved or fetched by decoder 372.

In one aspect, decoder 372 contains an audio decoder 374 and a video decoder 376 wherein audio buffer 374 retrieves audio packet from audio buffer 364 and subsequently decodes the audio packets to produce audio sound. Video decoder 376 is able to retrieve the video packets from buffer 366 and decodes the video packets to produce video images. The decoded video packets and audio packets are merged at decoder 372 to facilitate producing A/V frames. It should be noted that decoder 372 can be configured to include audio decoder 374 and video decoder 376.

SQoS, in one aspect, is capable of updating buffer capacity in a transparent way to generate A/V smoothness. To adjust buffer capacity, a threshold such as buffer threshold 368 or 370 is used to determine the actual buffer capacity. In one example, the buffer capacity can vary based on the adaptive latency estimate. When buffer capacity is recommended to be increased, threshold, for example, is increased accordingly to keep new latency scenario. Similarly, if the buffer capacity is recommended to be decreased, threshold will be decreased. It should be noted that changing buffer capacity to audio buffer 364 with a new pointing value of threshold 368 could potentially introduce new audio artifacts because different size of audio buffer introduces different latency. SQoS, in one aspect, is configured to monitor buffer status and audio content to minimize audio artifacts appearance.

Figure 4:
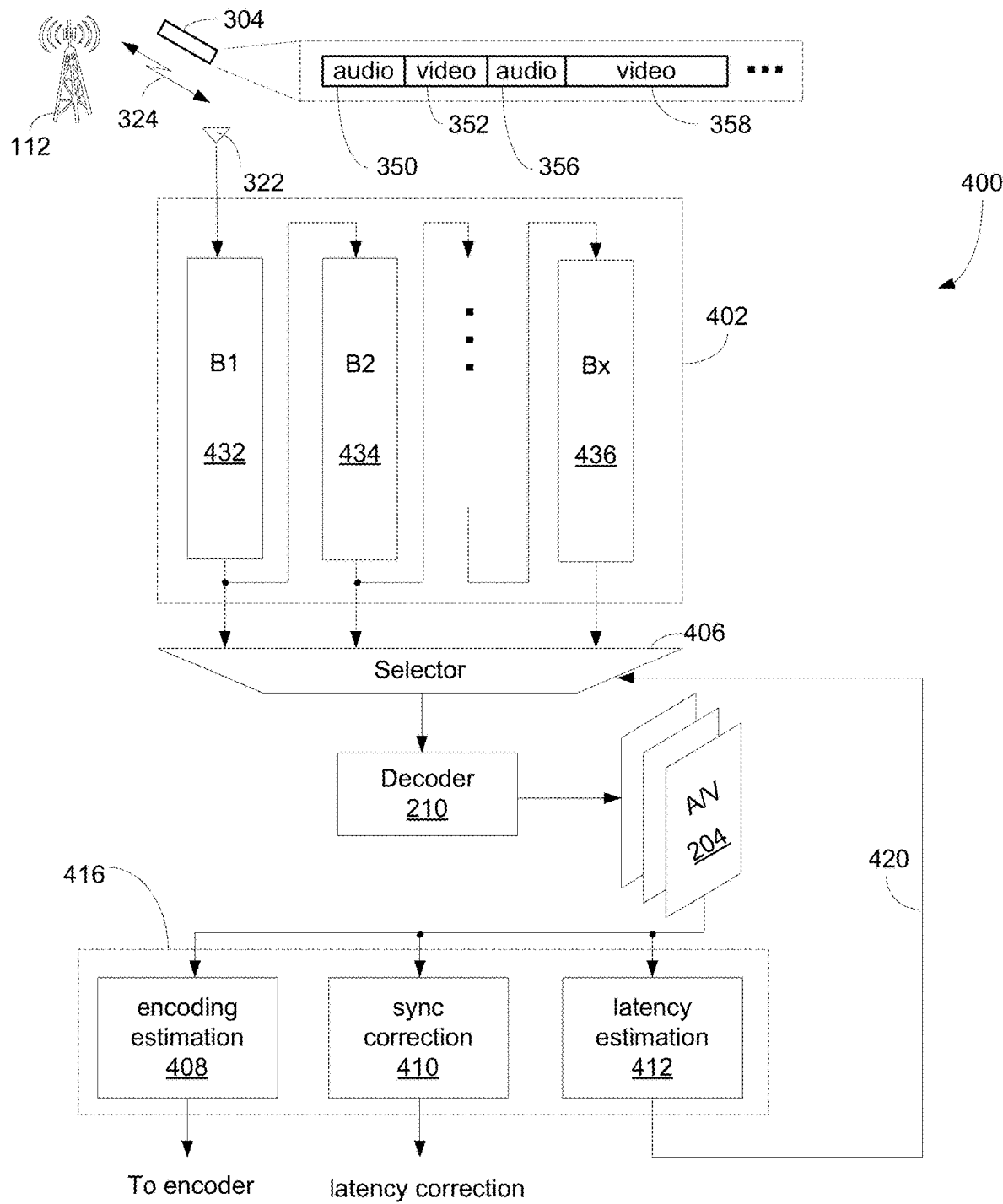
FIG. 4 is an alternative illustration logic flows at receiving side or RX end using SQoS to optimize image and sound quality in accordance with one embodiment of the present invention.

FIG. 4 is a diagram 400 illustrating logic flows at receiving side or RX end using SQoS to optimize image and sound quality in accordance with one embodiment of the present invention. Diagram 400, which is similar to diagram 300, shows a receiving side or sinking side apparatus having a buffer or adaptive buffer 402, selector 406, decoder 210, estimation module 416, and base station 112. In one aspect, SQoS can be implemented at buffer 402, selector 406, and/or estimation module 416. It should be noted that the underlying concept of the exemplary embodiment(s) of the present invention would not change if one or more blocks (or devices) were added to or removed from diagram 400.

Packet flow 304 contains audio and video packets 350-358 that are organized in an interleave format. Packet flow 304 is transmitted from TX to RX via base station 112. The RX side, in one embodiment, includes antenna 322, buffer 402, decoder 210, and estimation module 416. Upon arriving at RX side, the data flow such as flow 304 is temporary stored at buffer 402 waiting to be decoded or processed.

Buffer 402, also known as latency buffer or adaptive buffer, contains multiple memory storages 432-436. Each storage space such as storage 432 is configured to have similar buffering capacity as other storage space such as storages 434-436. In one aspect, storages 432-436 are interconnected in a concatenated formation wherein each storage has an input and output ("I/O") ports. The output ports of storage 434-436 are coupled to selector 406. Also, each output port is connected to the input port of a neighboring storage. For instance, the output port of storage 432 is coupled to the input port of storage 434 to form a concatenated or "daisy chain" like configuration. Based on the concatenated connection, the output of storage 434 includes buffer size of storage 432 plus storage 434. Based on the value of adaptive latency estimate, SQoS can select an optimal storage capacity or buffer size to achieve best A/V quality via selector 406.

Decoder 210, in one example, is capable of retrieving stored A/V packet(s) from storage 432, storage 434, or storage 436 based on select signal 420. Select signal 420 is generated by estimation module 416 using preliminary latency estimation from buffer status statistics analysis and A/V frames 204 as IAQ values. It should be noted that if the output of storage 436 is selected, it indicates that the maximum buffering capacity (i.e. storages 432-436) is selected.

In one aspect, SQoS, also known as RX SQoS, is operated at the RX side. SQoS uses RX side A/V transmission statistics to estimate optimal configuration for different blocks of A/V transmission system. To achieve optimal A/V quality performance, SQoS uses encoding bit rate estimation 408, A/V sync 410, and A/V playback buffering (latency) estimation 412. While encoding bit rate estimation 408 is used to reduce continuous packet loss via bit rate adjustment, A/V sync 410 deals with data prioritizing to reduce miss-performance. The miss-performance is a deviation from a normal operation. A/V playback buffering (latency) estimation 412 includes an adaptive buffering mechanism.

SQoS, in one example, employs estimation module 416 to generate at least a portion of adaptive latency estimate(s). Estimation module 416 includes an error encoding estimation 408, sync correction 410, and latency estimation 412 to implement a process of adaptive latency estimation. Encoding estimation 408, in one example, includes detecting and processing A/V encoding related errors. Sync correction 410 deals with RX sync correction and latency estimation 412 generates A/V playback buffering estimation.

SQoS is able to instruct TX to increase or decrease bit rate to improve overall A/V quality. SQoS also detects different types of packet loss scenarios. For instance, upon detecting a burst of packet loss, SQoS may instruct TX to decrease bit rate during the subsequently encoding process. Similarly, if a scenario of no packet loss is detected, SQoS may instruct to increase bit rate to refine transmission performance.

It should be noted that the algorithm to perform encoding estimation 408 may be based on an initially defined bit rate. In operation, if packet loss occurs, TX may be instructed to lower the bit rate until a scenario of no packets loss is reached. The reference encoding bit rate is accordingly established. If no packets loss happens during the last REF_BR_INITIAL_TIME, increasing encoding bit rate is carried out until continuous packets loss start to happen. The (encoding) bit rate decreases if the frequency of packet loss is logic one (1). The (decoding) bit rate increases if the frequency of packet loss is logic zero (0).

Sync correction 410 operates an A/V receiving sync correction. SQoS includes a mechanism to detect A/V receiving sync miss-performance that may cause extra latency. To reduce the miss-performance, updating in different ways A/V latency can be updated in various approaches to achieve optimal E2E latency performance. Note that using the correction mechanism of A/V receiving sync to achieve optimal E2E latency, in some instances, can cause lip sync miss-performance. The correction mechanism of A/V receiving sync can be used to manage increasing in latency increase due to A/V recv sync miss-performance. A logic expression of sync correction at the RX end can be illustrated as below.

After AV_RECV_CORR_INITIAL_TIME, average A/V Recv sync for last AV_RECV_CORR LONG_TERM_TIME is checked continuously (avg_av_recv_sync), being av_recv_sync:

av_recv_sync=last_audio_pts_receiving−last_video_pts_receiving
    So:
    if (current_av_recv_correction=0):
      av_thresh=SQOS_AV_RECV_INITIAL_TH
      va_thresh=SQOS_VA_RECV_INITIAL_TH
      audio_ahead_video_being_recovered=0
      video_ahead_video_being_recovered=0
    if (current_av_recv_correction<0):
      va_thresh=SQOS_VA_RECV_TH
      av_thresh=max(SQOS_VA_RECV_TH, (−current_av_recv_correction))
      audio_ahead_video_being_recovered=1
    if (current_av_recv_correction>0):
      av_thresh=SQOS_AV_RECV_TH
      va_thresh=SQOS_VA_RECV_TH
      video_ahead_video_being_recovered=1
    if (avg_av_recv_sync<−va_thresh)
      if (video_ahead_video_being_recovered=1) means that video was ahead audio and it was corrected, so original AV recv is starting to recover so current_av_recv_correction will be closer to 0.
      If (video_ahead_video_being_recovered=0) means that AV recv was not corrected before and it is going to be corrected.
    if (avg_av_recv_sync>av_thresh)
      if (audio_ahead_video_being_recovered=1) means that audio was ahead video and it was corrected, so original AV recv is starting to recover so current_av_recv_correction will be closer to 0.
      If (audio_ahead_video_being_recovered=0) means that AV recv was not corrected before and it is going to be corrected.

The algorithm illustrates an exemplary correction if an initial deviation exceeds initial thresholds.

Latency estimation 412, in one aspect, delivers adaptive A/V playback buffering (latency) estimation. It should be noted that incorrect buffering (latency) setting at the RX side can cause A/V artifacts, such as video judder/tearing or audio jitter/crapping. If the data buffer ("DB") level is underflow, the artifacts can be introduced or aggravated. Underflow is a situation where the buffer becomes empty. If the data buffer ("DB") level is overflow, the artifacts can also be introduced or aggravated. Overflow is a phenomenon in which too much data arrives at the same time and the buffer is unable to store the data. In a low latency system, SQoS increases buffer size to increase latency which will reduce packet loss or data loss.

For a low latency A/V transmission system, required buffering or latency can vary depending on TX. The required buffering or latency may also vary depending on channel's characteristics and traffic condition. The following illustration is to show a process of buffering adjustment based on adaptive latency estimate. Note that buffering is in millisecond ("ms"), and the relationship between buffering and latency can be expressed in the following logic expression.

latency_in_msecs=buffering_in_bytes/bytes_to_msecs_conversion

Where:
  a. Encoded data=>bytes_to_msecs_conversion=enc_bit_rate_kbps/8
  b. Raw data=>will depend on raw data units, for example if in frames units. bytes_to_msecs_conversion=bytes_per_frame*msecs_per_frame/number_of_frames In any case SQoS will take into account any buffering in decoding/presentation processes (enc/raw data). In the event that "enc_bit_rate_kbps" is not known, buffering can be controlled by using A/V Presentation Time Stamps (PTSs). PTSs are used for AV sync operation. It should be noted that earlier and/or later PTS can be managed or controlled in buffer instead of knowing exact number of bytes needed for buffer. In one example, a real buffer size should be large enough to stored data in a worst case scenario for an expected latency.

Setting an initial latency (ref_latency), so initial buffering is performed according to the initial latency value. If ref_latency is optimal for current scenario, neither buffer overflow nor underflow conditions should occur.

1) SQOS_INITIAL_CHECK_INTERVAL is waited to avoid any transitory TX characteristics that could result in incorrect latency estimation. This initial interval will be performed after any "context change" just to avoid incorrect estimation due to transitory behaviors, so:

curr_latency=initial_latency

2) DB maximum (max_buff_in_msecs) and minimum (min_buff_in_msecs) levels are checked continuously and processed every SQOS_LAT_EST_SHORT_TERM_TIME. So a short term latency estimation (latency_est_st) is performed as:

latency_est_st=max_buff_in_msecs−min_buff_in_msecs

3) Based on short term time statistics in 2), the following long term statistics are collected for SQOS_LAT_EST_LONG_TERM_TIME:

a. latency_est_lt: that will be the long term average latency estimation. Based on short term latency estimations (latency_est_st) on last SQOS_LAT_EST_LONG_TERM_TIME.
b. min_buff_in_msecs_lt: that will be the long term average DB minimum level. Based on short term DB minimum level (min_buff_in_msecs) on last SQOS_LAT_EST_LONG_TERM_TIME.
c. Note that any short term value that comes for a period where packets lost happened WILL BE DISCARDED.
4) Every SQOS_LAT_EST_SHORT_TERM_TIME SQoS will make decisions about RX latency (buffering) setting.
  a. Final latency estimation (final_latency_est_lt) set as:

final_latency_est_lt=AVG(latency_est_lt,latency_est_st)

b. No packets lost must have happened in SQOS_LAT_EST_SHORT_TERM_TIME so:
    i. If (final_latency_est_lt>(curr_latency+inc_latency_margin)) latency will be INCREASED as final_latency_est_lt.
    ii. If (final_latency_est_lt<(curr_latency−dec_latency_margin)) and (min_buff_in_msecs_lt>min_buffer_margin) latency will be DECREASED as final_latency_est_lt. Note that setting new latency should not make min_buff_in_msecs_lt be close to 0 so we could make buffer underflow more probable. Note:
      1. This conditions must be met at least in two consecutive SQOS_LAT_EST_SHORT_TERM_TIME slots of time.
      2. If any of the conditions are not met during (1) decreasing process will be initialized.
5) If "context change" happens SQOS_INITIAL_CHECK_INTERVAL wait will applied to resume SQoS operation.
  a. Continuous packets dropped.
  b. Latency changes (either increase or decrease).

Figure 5:
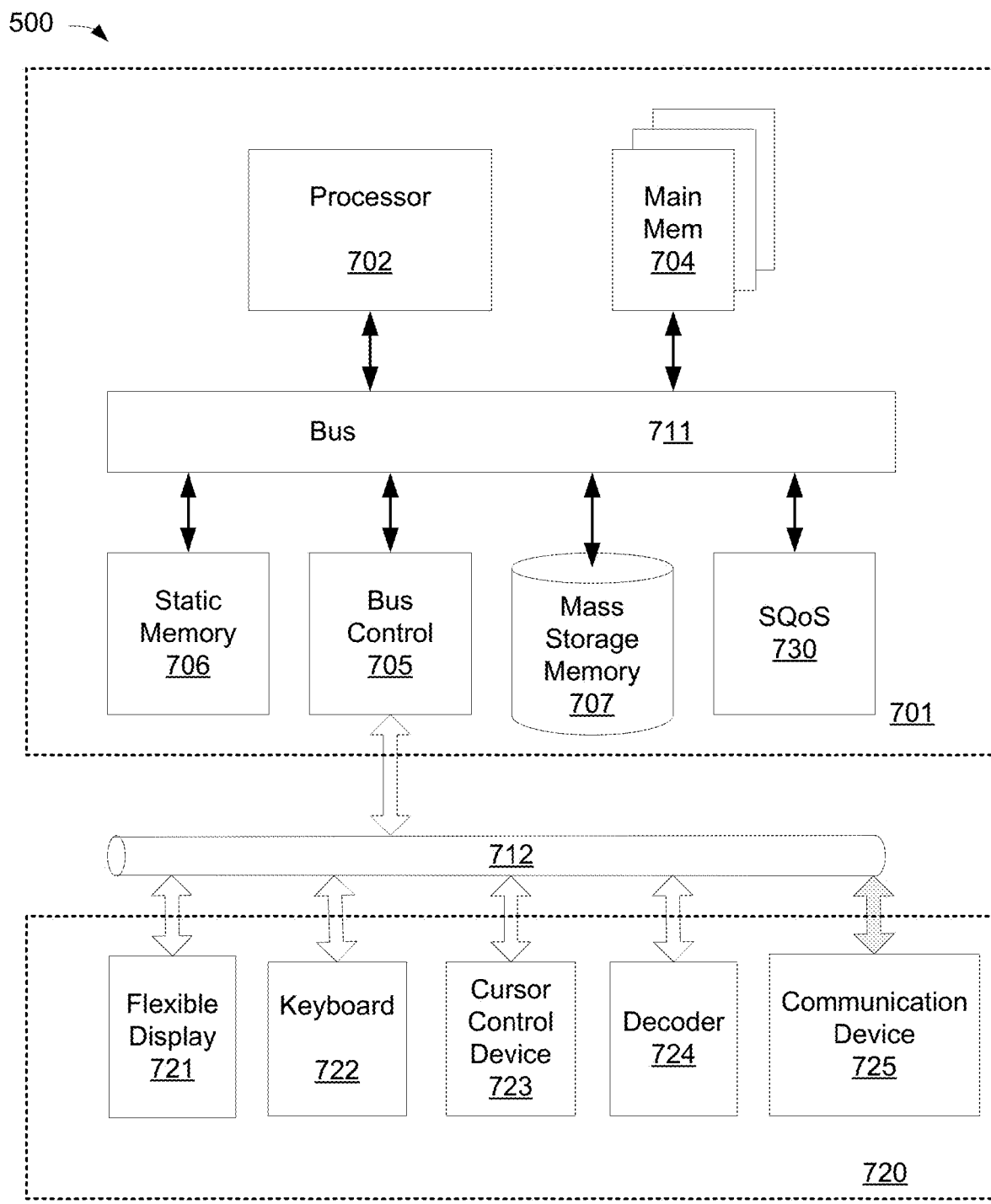
FIG. 5 is a block diagram illustrating an exemplary system capable of providing SQoS operation in accordance with one embodiment of the present invention.

Having briefly described aspect of SQoS able to enhance audio video quality based on buffer status statistics analysis and earlier decoded data (IAQ), FIG. 5 is a block diagram illustrating an exemplary transmission system capable of operating SQoS in accordance with one embodiment of the present invention. FIG. 5 illustrates an exemplary computing system 500 with feature of SQoS may be implemented. It will be apparent to those of ordinary skill in the art that other alternative network or system architectures may also be employed.

Computer system 500 includes a processing unit 701, an interface bus 712, and an input/output ("IO") unit 720. Processing unit 701 includes a processor 702, main memory 704, system bus 711, static memory device 706, bus control unit 705, and mass storage memory 707. Bus 711 is used to transmit information between various components and processor 702 for data processing. Processor 702 may be any of a wide variety of general-purpose processors, embedded processors, or microprocessors.

Main memory 704, which may include multiple levels of cache memories, stores frequently used data and instructions. Main memory 704 may be RAM (random access memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Mass storage memory 707 may be a magnetic disk, solid-state drive ("SSD"), optical disk, hard disk drive, floppy disk, CD-ROM, and/or flash memories for storing large amounts of data.

I/O unit 720, in one example, includes a display 721, keyboard 722, cursor control device 723, web browser 724, and communication device 725. Display device 721 may be a liquid crystal device, flat panel monitor, cathode ray tube ("CRT"), touch-screen display, or other suitable display device. Display 721 projects or displays graphical images or windows. Keyboard 722 can be a conventional alphanumeric input device for communicating information between computer system 700 and computer operator(s). Another type of user input device is cursor control device 723, such as a mouse, touch mouse, trackball, or other type of cursor for communicating information between system 700 and user(s).

Communication device 725 is coupled to bus 711 for accessing information from remote computers or servers through wide-area network. Communication device 725 may include a modem, a router, or a network interface device, or other similar devices that facilitate communication between computer 700 and the network. In one aspect, communication device 725 is configured to perform wireless functions.

SQoS 730, in one aspect, is coupled to bus 711 and is configured to enhance audio and video quality based on decoded A/V frames. SQoS 730 can be hardware, software, firmware, or a combination of hardware, software, and firmware.

The exemplary aspect of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary aspect of the present invention. Alternatively, the steps of the exemplary embodiment of the present invention may be performed by specific hardware components that contain hard-wired logic for performing the steps, or by any combination of programmed computer components and custom hardware components.

Figure 6:
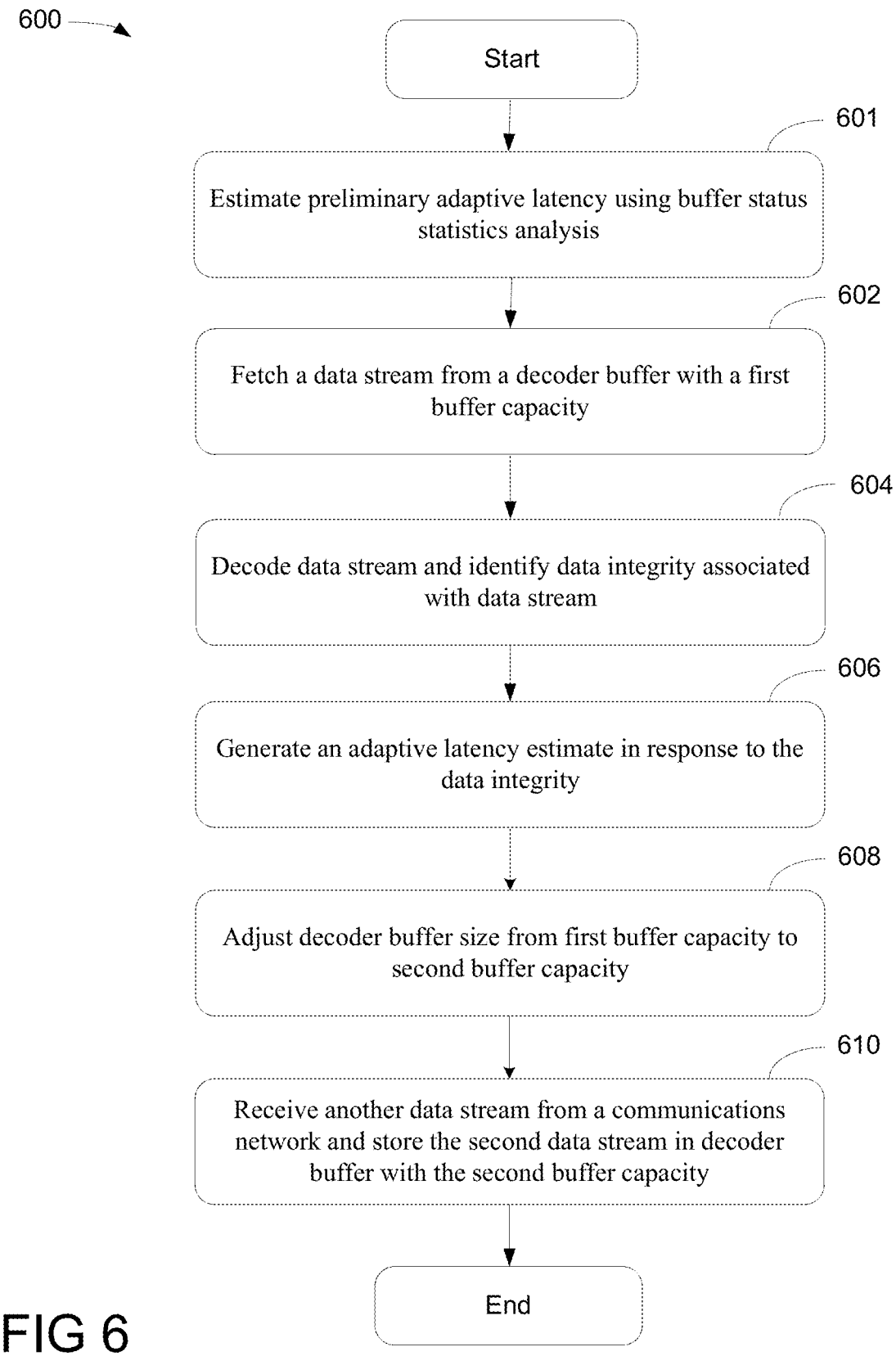
FIG. 6 is a flowchart illustrating a process of SQoS by adjusting buffer capacity in accordance with one embodiment of the present invention.

FIG. 6 is a flowchart 600 illustrating a process of SQoS by adjusting buffer capacity in accordance with one embodiment of the present invention. At block 601, the process of SQoS is able to collect the buffer status statistics with short term as well as long term. Based on the buffer status statistics, the preliminary adaptive latency estimate is analyzed. At block 602, the process of SQoS fetches a first data stream from a decoder buffer with a first buffer capacity. In one example, one or more audio video data packets are obtained from the decoder buffer.

At block 604, after decoding the first data stream, data integrity associated with the first data stream is identified based on a set of predefined parameters. For example, data integrity or A/V quality includes video judder associated with the data stream. Audio jitter associated with the data stream containing audio video packets can also be determined. In addition, audio video lip synchronization associated with the data stream containing audio video packets can also be identified. In one aspect, data integrity or A/V quality analysis is part of ALE process to determine adaptive latency estimate.

At block 606, the adaptive latency estimate is generated in response to the data integrity or A/V quality associated with the first data stream. For example, packets loss may be identified. Also, an audio video synchronization miss-performance associated to the first data stream is detected. In one aspect, the adaptive latency estimate is updated or generated based on decoded A/V packet flows.

At block 608, the decoder buffer is adjusted from the first buffer capacity to a second buffer capacity in accordance with the adaptive latency estimate. For example, buffer capacity associated with the decoder buffer is increased to a predefined level based on the adaptive latency estimate. Note that different buffer capacity can be selected in response to the different values associated with adaptive latency estimate.

At block 610, after receiving a second data stream from a communications network, the second data stream is stored in the decoder buffer with the second buffer capacity. In one aspect, the process is capable of sending a rate change message to a transmitter indicating adjustment of bit rate in response to the adaptive latency estimate. After fetching the second data stream from the decoder buffer, the second data stream is decoded. The second data integrity or A/V quality associated with the second data stream is subsequently identified and analyzed based on the set of predefined parameters. After generating a second adaptive latency estimate in response to the second data integrity associated with the second data stream, the decoder buffer is adjusted from the second buffer capacity to a third buffer capacity in accordance with the second adaptive latency estimate. The process receives a third data stream from the communications network and stores the third data stream in the decoder buffer with the third buffer capacity.

Figure 7:
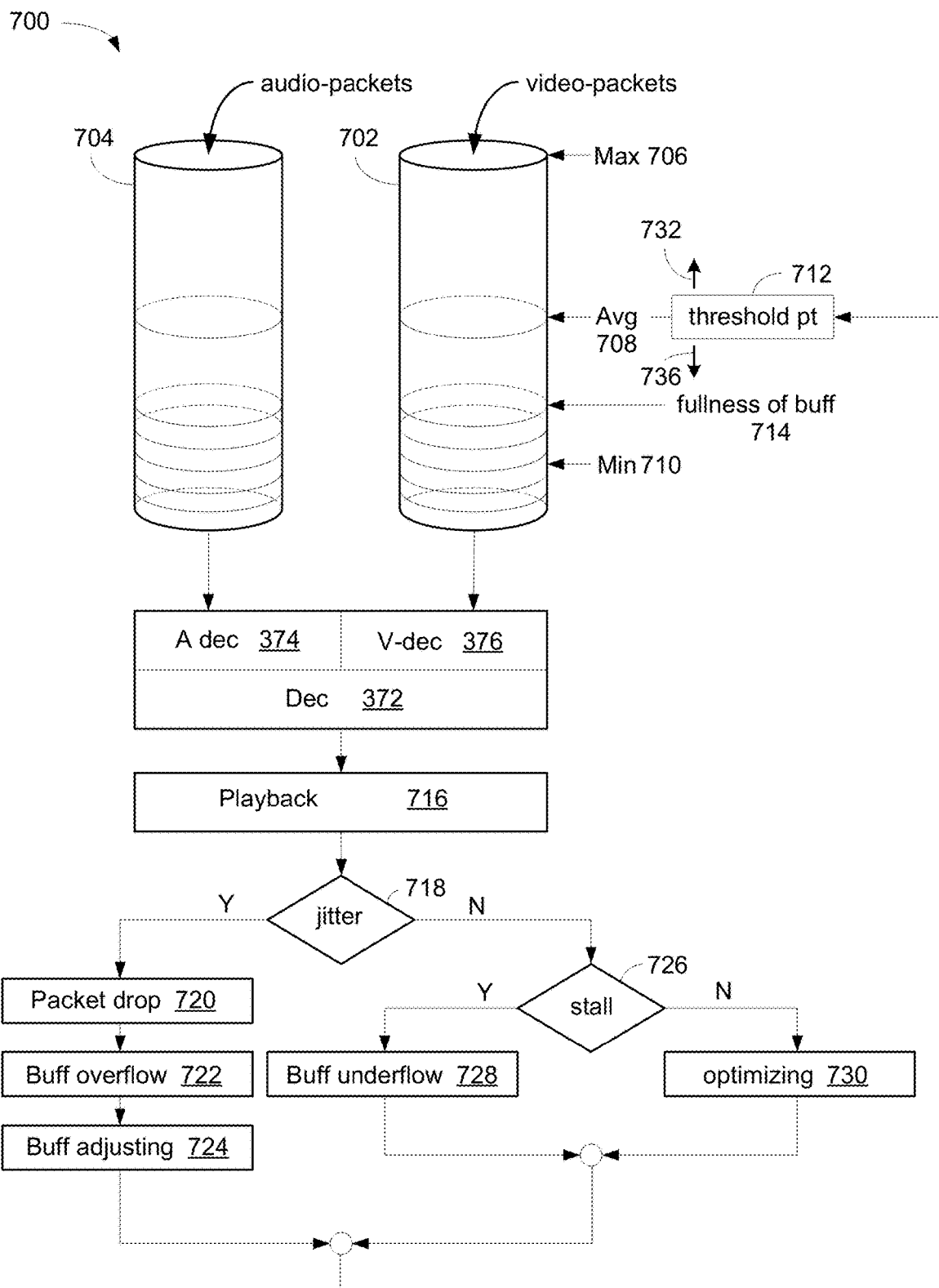
FIG. 7 is a block diagram illustrating an exemplary process of adjusting buffer capacity using buffer status statistics in accordance with one embodiment of the present invention.

FIG. 7 is a block diagram 700 illustrating an exemplary process of adjusting buffer capacity using buffer status statistics in accordance with one embodiment of the present invention. Diagram 700 illustrates a process of analyzing buffer status statistics and adjusting buffer capacity(s) using threshold pointer(s) based on analyzed buffer statistics. In one aspect, diagram 700 includes a buffering device including an audio buffer 704 and a video buffer 702. Each of buffers 702-704, in one example, can be assigned to maximum capacity 706, average capacity 708, or minimum capacity 710. During a preliminary phase, the initial capacity for both buffers 702-704, in one example, can be set to average capacity 708 as pointed by threshold pointer 712. It should be noted that the underlying concept of the exemplary embodiment(s) of the present invention would not change if one or more blocks (or devices) were added to or removed from diagram 700.

During the phase of preliminary adaptive latency estimate, SQoS is activated to set a predefined initial buffer size such as average capacity 708 for both audio buffer 704 and video buffer 706 using threshold pointer 712. Threshold pointer 712 can move up or down as indicated by arrows 732-736 to adjust or update buffer size based on the values of adaptive latency estimate. After demultiplexing the A/V packets, audio packets are buffered in audio buffer 704 with average capacity 708 and video packets are buffered in video buffer 702 with average capacity 708. Depending on the applications, a single A/V buffer containing an audio buffer section and a video buffer section can be implemented. In the present illustration, a buffer threshold pointer 712 is used to set size of bot buffers 702-704 to an average capacity.

After buffering A/V packet stream or A/V packets in the A/V buffer or buffers 702-704, the A/V packet stream is demultiplexed to separate audio packets and video packets from the A/V packet stream. The audio packets are stored in audio storage section 704 of the A/V buffer and the video packets are stored in a video storage section 702 of the A/V buffer. In an alternative embodiment, audio packets are stored in audio buffer 704 and video packets are stored in video buffer 702. After fetching packets from buffers 702-704, the packets are decoded and a set of decoded A/V frames are generated based on the decoded packets. The decoded A/V frames are subsequently used to identify A/V artifacts during the playback. Note that A/V artifacts include video judder and audio jitter associated with the decoded A/V frames. Upon updating the adaptive latency estimate in response to the A/V artifacts, the size of A/V buffer is adjusted based on updated adaptive latency estimate. In one example, the storage capacity of buffer 702 can change from average capacity 708 to maximum capacity 706. Note that changing buffer size alters latency which could increase or decrease A/V artifacts.

The analysis of buffer status statistics can be defined as buffer status, buffer usage, or buffer fullness associated to a buffer at a given instant of time. The usage or fullness of buffer 714, for example, changes or varies constantly over-time based on the network traffic, transmission carries, nature of content, and the like. The variation of buffer fullness or usage can result additional A/V artifacts during playback. For example, under the condition of buffer overflow, latency keeping mechanism drops audio and video packets to maintain required minimal latency which could cause additional video and/or audio jitter. Under the condition of buffer underflow, audio and/or video playback can stall due to waiting for new data. It should be noted that by adjusting latency which can be controlled at least partially by adjusting buffer size, optimal A/V playback can be achieved when A/V data arrives on time for a given latency (or buffering).

During an operation, A/V frames are played back at block 716 by the process of analyzing buffer status statistic. At block 718, the process checks whether the A/V frames contains jitter(s). The process proceeds to block 720 if the jitter is detected. At block 720, jitter could be caused by packet drop or buffer overflow at block 722. After buffer adjustment is sent at block 724, the process proceeds to update the threshold pointer 712 to adjust or update the buffer capacity associated with buffers 702-704. The process alternatively proceeds to block 726 after block 718. At block 726, the process checks to see if a stall condition is detected. The process proceeds to block 728 if the stall condition is detected. At block 728, a buffer underflow condition can be verified and buffer status statistics can be obtained. At block 730, a continuing refinement of latency time is processed. The refinement, in one aspect, invoices fine turning the size of the buffer.

Figure 8:
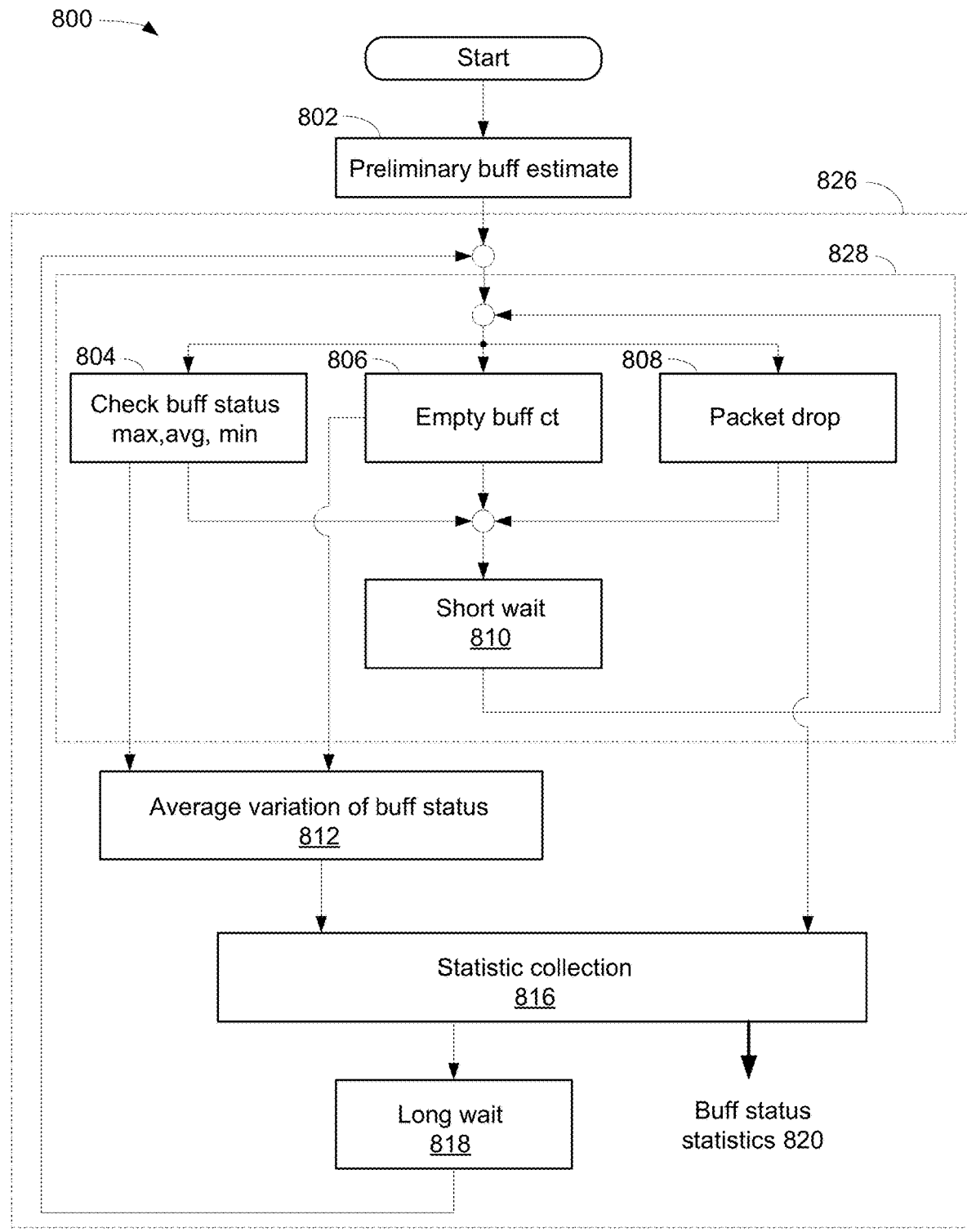
FIG. 8 is a flowchart illustrating a process of identifying buffer status statistics in accordance with one embodiment of the present invention.

FIG. 8 is a flowchart 800 illustrating a process of identifying buffer status statistics in accordance with one embodiment of the present invention. At block 802, a process for collecting buffer statistics is able to set a variable storage size of an A/V buffer to a preliminary default buffer capacity. After identifying buffer volume usage associated with the A/V buffer during a first period of time such as preliminary period of time, the occurrence of empty buffer associated with the A/V buffer is counted at block 804 during an initial period of time at block 806. Upon recording the occurrence of packet drop associated with the A/V buffer at block 808, the buffer status statistics associated with the A/V buffer is generated in response to the buffer volume usage, the occurrence of empty buffer, and the occurrence of the packet drop. After calculating an average value of buffer volume usage at block 812, the adaptive latency estimate is updated as indicated by numeral 820 in accordance the buffer status statistics at block 816. In one example, the variable capacity of the buffer or buffers can be adjusted to the maximum, average, or minimum capacity of A/V buffer. After waiting at block 818, a loop begins to collect new statistics data.

To obtain buffer status, SQoS, in one aspect, collects short term statistics and long-term statistics. The short-term statistics collection includes collecting A/V buffer(s) usage or fullness in connection a set of predefined levels, such as max, avg, and min. The short-term statistics operates a predefined short time period such as two (2) seconds. The short-term statistics collection also counts the occurrence of empty buffer and packets drop. For long term statistics collection, SQoS collects and averages buffer status and packet drop in a predefined longer period of time such as 20 seconds. Long term statistics collection, in one example, provides an average value of buffer status collected during the short-term statistics collection.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for generating storage statistics, comprising:
setting variable storage size of an audio video ("A/V") buffer to a preliminary default buffer capacity;
identifying buffer volume usage associated with the A/V buffer during a first period of time;
counting occurrence of empty buffer associated with the A/V buffer during the first period of time;
recording occurrence of packet drop associated with the A/V buffer during the first period of time; and
generating buffer status statistics associated with the A/V buffer in response to the buffer volume usage, the occurrence of empty buffer, and the occurrence of the packet drop.

2. The method of claim 1, further comprising calculating an average value of buffer volume usage.

3. The method of claim 1, wherein identifying buffer volume usage associated with the A/V buffer includes determining one of maximum usage of the A/V buffer, average usage of the A/V buffer, and minimum usage of the A/V buffer.

4. The method of claim 1, further comprising updating adaptive latency estimate in accordance the buffer status statistics.

5. The method of claim 4, further comprising updating buffer size of the A/V buffer in response to the adaptive latency estimate.

6. The method of claim 1, further comprising detecting occurrence of buffer overflow associated with the A/V buffer during the first period of time.

7. The method of claim 6, further comprising updating buffer size of the A/V buffer in response to the occurrence of the buffer overflow.

8. The method of claim 7, further comprising adjusting the buffer size of the A/V buffer in a second period of time in response to information collected during the first period of time.

9. The method of claim 1, further comprising:
collecting the buffer status statistics associated to the A/V buffer; and
analyzing adjustment to buffer size based on the buffer status statistics of the A/V.

10. The method of claim 1, wherein setting variable storage size of an buffer includes setting an audio storage of the A/V buffer to a first audio buffer capacity.

11. The method of claim 10, wherein setting variable storage size of an A/V buffer includes setting a video storage of the A/V buffer to a first video buffer capacity.

12. The method of claim 11, herein setting variable storage size of an A/V buffer includes setting a data storage of the A/V buffer to a first data buffer capacity.

13. A network system configured to provide enhanced quality of service, comprising:
a transmitter operable to encode and transmit audio video ("A/V") packets from a source to a destination;
a transmission channel coupled to the transmitter and configured to transport the A/V packets received from the transmitter;
an A/V buffer with an adjustable storage size coupled to the transmission channel and configured to set a preliminary default buffer capacity for the A/V buffer; and
a receiver coupled to the A/V buffer and configured to generate a buffer status report associated with the A/V buffer in response to a buffer volume usage, an occurrence of empty buffer, and an occurrence of a packet drop, wherein the receiver is able to record the occurrence of the packet drop associated with the A/V buffer during a previous A/V packet transmission.

14. The system of claim 13, wherein the receiver is able to identify the buffer volume usage associated with the A/V buffer during a previous A/V packet transmission.

15. The system of claim 13, wherein the receiver is able to count the occurrence of empty buffer associated with the A/V buffer during a previous A/V packet transmission.

16. The system of claim 13, wherein the A/V packets are transmitted via a wireless communications network.

17. The system of claim 13, wherein the receiver includes a buffer status statistics analysis configured to identify status of the A/V buffer.

18. The system of claim 13, wherein the receiver includes an estimation module configured to facilitate error detection and buffer size estimation.

* * * * *